Nov. 24, 1959  K. GIERAY ET AL  2,913,894
SAFETY LOCK FOR DIESEL ENGINE VEHICLES
Filed Sept. 22, 1955  3 Sheets-Sheet 1
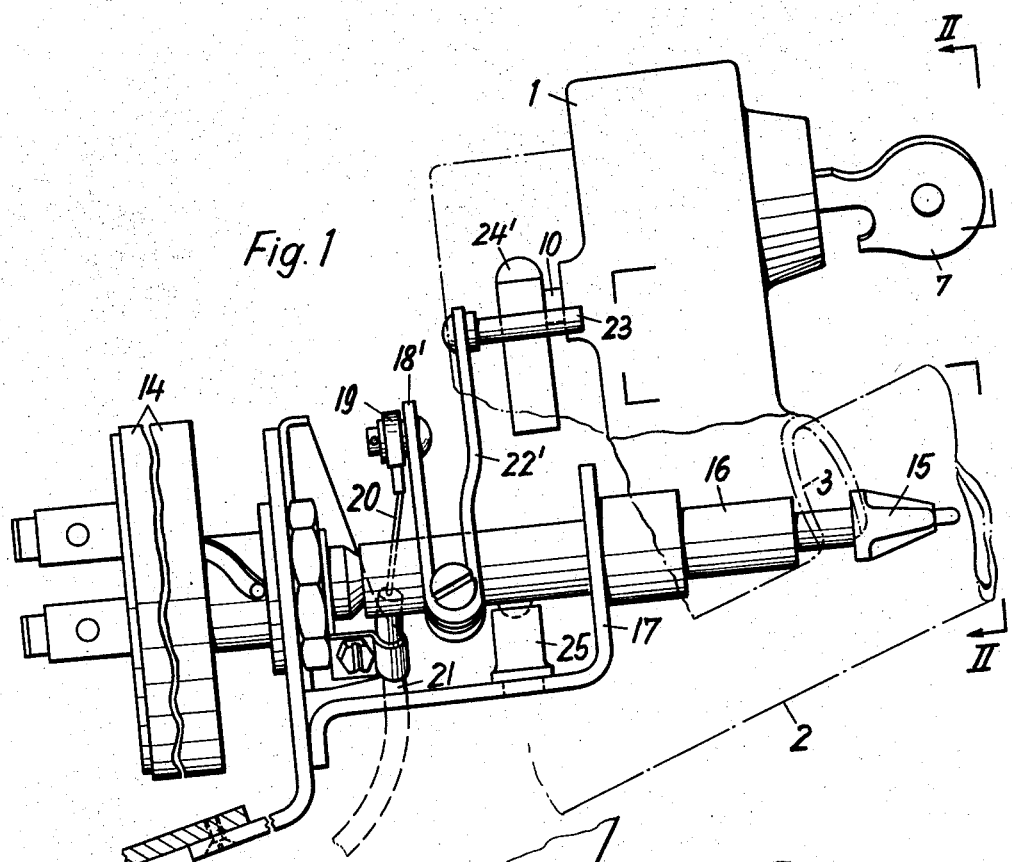
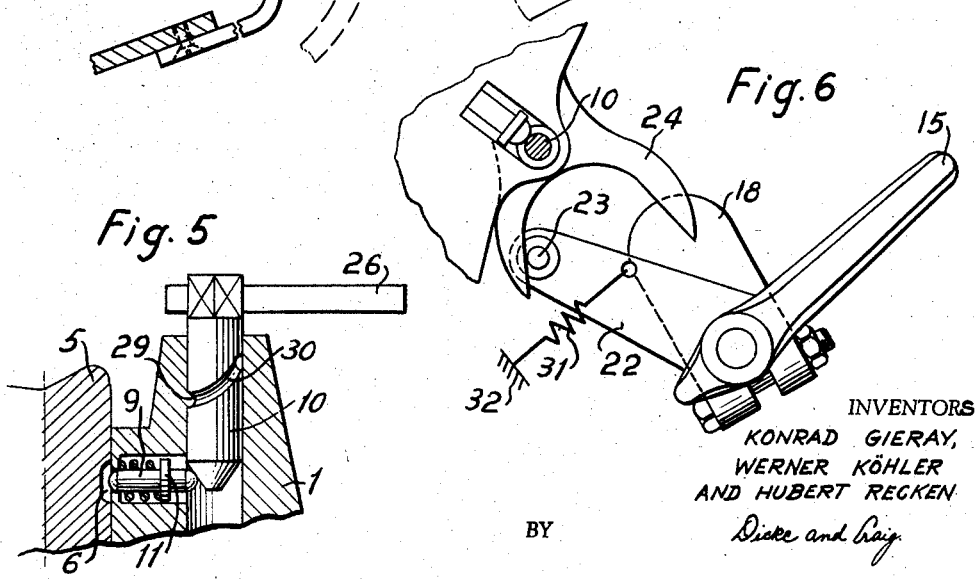
INVENTORS
KONRAD GIERAY,
WERNER KÖHLER
AND HUBERT RECKEN
BY Dicke and Craig
ATTORNEYS.

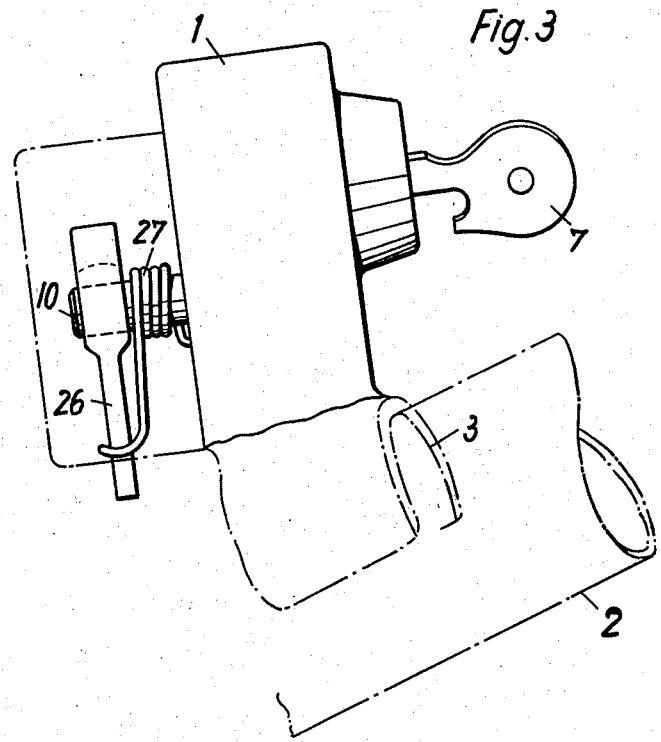
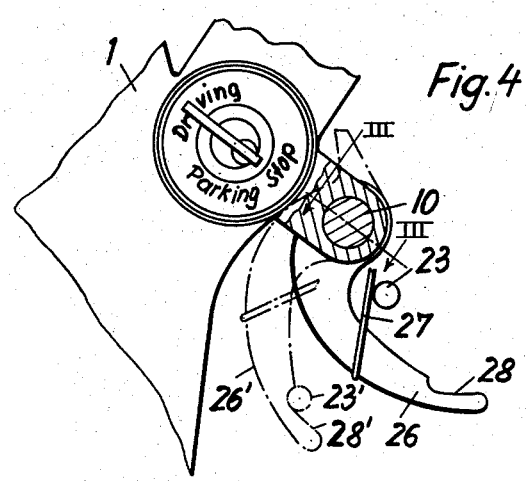

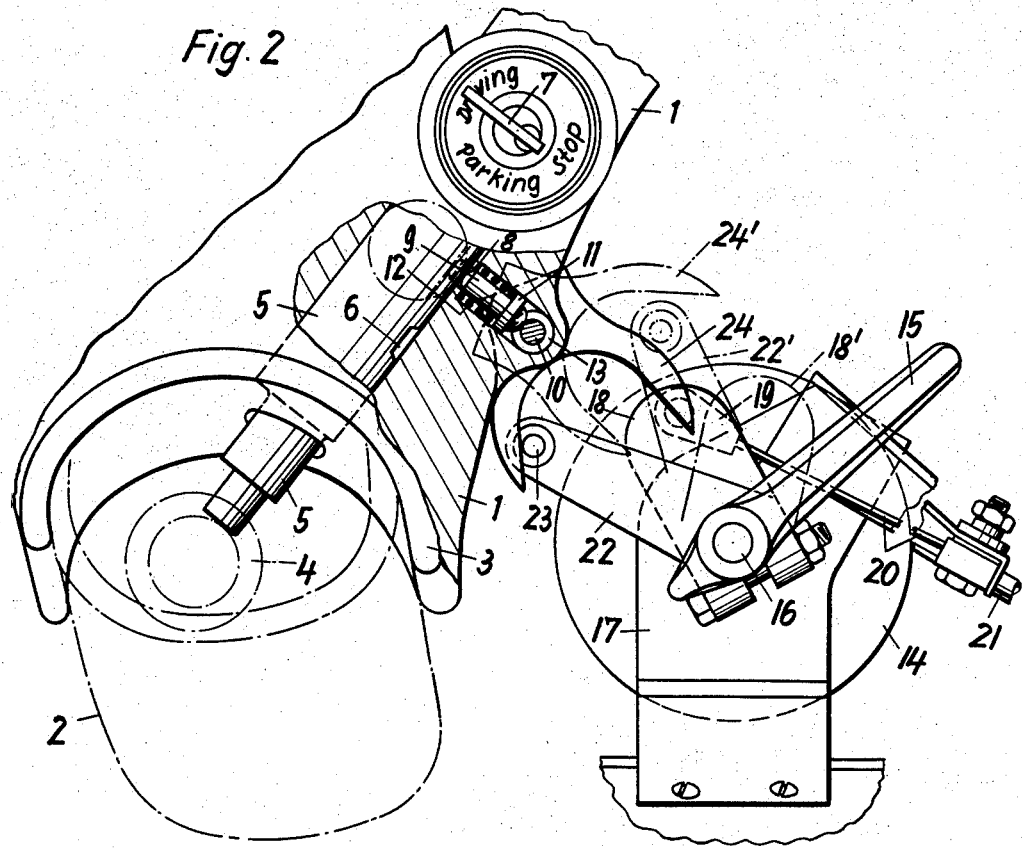

United States Patent Office 2,913,894
Patented Nov. 24, 1959

2,913,894

SAFETY LOCK FOR DIESEL ENGINE VEHICLES

Konrad Gieray, Stuttgart-Unterturkheim, Werner Köhler, Stuttgart-Degerloch, and Hubert Recken, Hilden/Rhineland, Germany, assignors to Daimler-Benz Aktiengesellschaft, Stuttgart-Unterturkheim, Germany Application September 22, 1955, Serial No. 535,958

6 Claims. (Cl. 70—237)

The present invention relates to a safety lock for diesel engine vehicles.

It is an object of the present invention to provide a burglar-proof safety lock which consists of a combination of two locks, namely, a steering lock which may be operated by a removable key for locking the steering wheel shaft so as not to be rotatable, and an additional locking mechanism which cooperates with the steering lock and includes a locking pin which is mounted in the housing of the steering lock and adapted to engage the locking bar of the steering lock so as to lock the same in the unlocked position. This additional locking mechanism is designed to exert its locking action upon the locking bar of the steering lock only when the controls of the injection pump of the diesel engine are operated to stop the fuel supply, and when preferably also a hot-bulb starter switch is turned to its off-position. Thus, when the control handle of the starter switch is turned to the stopping position, the injection pump is likewise turned off, and at the same time the locking pin is pulled out of a notch in the locking bar of the steering lock and arrested in such withdrawn position, thus permitting the locking bar to be operated by the removable key to engage with the steering wheel shaft.

The safety lock according to the invention consists of a housing which contains the steering lock, the mentioned locking pin, as well as a bolt which cooperates with the locking pin to arrest the same in its unlocked position. This housing is preferably mounted on the steering column substantially within the plane of the usual dashboard of the vehicle. A start-and-stop control mechanism is provided on the dashboard closely adjacent to the steering lock, and this control mechanism is preferably combined with a hot-bulb starter switch and operated by a control handle on the dashboard. This starter switch is further connected, for example, by a Bowden wire, with the injection pump of the engine so that when the control handle of the switch is turned to the stop position, the injection pump is likewise controlled to stop the fuel supply.

The present invention further consists in providing a control lever on the free end of a bolt which is mounted in the steering lock housing and designed to be shifted in a longitudinal direction when said control lever is turned by the operation of the switch handle. This bolt is provided with a transverse notch or aperture which, when the switch control handle is turned to the "off" or stopping position, is shifted longitudinally to such an extent that the adjacent locking pin which is mounted in the steering lock housing intermediate such bolt and the locking bar of the steering lock may disengage from its locking engagement with the locking bar under the action of a spring and by the same action enter with its other end into the notch in the sliding bolt, thus locking said bolt and the control lever thereon in a fixed position. In such a position of the bolt and locking pin, the locking bar is free to be easily moved by a turn of the removable key into locking engagement with the steering wheel shaft.

The bolt and control lever thereon will then remain in such fixed position until the key is turned to withdraw the lock bar from the steering wheel shaft and the control lever is then positively acted upon by an operation of the switch handle to turn the starter switch as well as the injection pump to the "on" or driving position.

According to another feature of the invention, the shaft of the starter switch carries a lever which is pivoted when the switch handle is operated. This lever carries a control pin which is designed to engage the control lever to operate the same. According to one preferred embodiment of the invention, this control lever may be designed in the shape of a bifurcated lever which has an opening between its prongs of a size and shape so that the control pin on the switch lever will be disposed between the prongs and act upon one or the other to take the control lever along in either direction of its movement so as to turn the control lever sufficiently to slide the bolt in or out of the locking engagement of its notch with the locking pin.

According to another feature of the invention suitable means may be provided to arrest the bifurcated control lever resiliently in either of its end positions as long as the lever is not again positively moved out of such end position by an operation of the switch handle and the corresponding movement of the switch lever and the control pin thereon which then acts upon the control lever to pivot it to its other end position.

According to another preferred embodiment of the invention, the control lever may also consist of a single arm which is acted upon by a torsion spring and thus tends to assume a position which corresponds to the driving position of the steering lock, from which it may then be resiliently taken along into the position corresponding to the stopping position of the steering lock by the action of the control pin on the switch lever when the latter is moved to the stopping position.

Further objects, features, and advantages of the present invention will be apparent from the following detailed description thereof, as well as from the accompanying drawings, in which—

Fig. 1 shows a side view of a safety lock with the control handle of the hot-bulb starter switch in the operative position;

Fig. 2 shows a cross section taken along line II—II of Fig. 1, with parts of the apparatus being shown in a front view and the control handle of the hot-bulb starter switch in the "stop" position;

Fig. 3 shows a partial side view similar to Fig. 1 of a safety lock according to a modification of the invention;

Fig. 4 shows a cross section similar to that of Fig. 2 but through the apparatus as shown in Fig. 3;

Fig. 5 shows a cross section through the locking bolt taken along line III—III of Fig. 4; while Fig. 6 is a partial view of Fig. 2.

Referring to the drawings, and first particularly to Figs. 1 and 2, the steering lock, according to the invention, which is combined with a hot-bulb starter switch comprises a housing 1 which is mounted on a socket 3 surrounding the steering column 2. The steering lock contains a locking bar 5 which is provided within the housing 1 with a notch 6. Locking bar 5 is slidable into the space within the socket 3 and thus into a corresponding recess (not shown) in the steering wheel shaft 4 which has been indicated in Fig. 2 in dot-and-dash lines. By turning a removable safety key 7 in a lock provided in housing 1, locking bar 5 may slide in housing 1 in a longitudinal direction by means of a suitable mechanism not shown in the drawings, so that by turning key 7 in one or the other direction, the steering wheel which is mounted on the steering wheel shaft 4 may be either locked or unlocked.

Housing 1 is further provided with a bore 8 which extends transverse to the axis of movement of locking bar 5, in which a locking pin 9 is mounted so as to be slidable in a longitudinal direction. Bore 8 coincides with notch 6 only if locking bar 5 has been drawn back into the lock and the steering wheel is unlocked. In the locking position, as shown in Fig. 2, notch 6 will, however, be disposed in a position in which it is shifted relative to bore 8 toward steering column 4.

Bore 8 terminates relative to locking bar 5 into a further bore in the same housing 1 in which a locking bolt 10 is mounted. As shown in Fig. 5, locking bolt 10 is provided with a helical groove 30 in which a lug 29 formed on the wall that defines the last mentioned bore is received, said lug and groove cooperating to cause said bolt 10 to slide in a longitudinal direction when the same is rotated in a manner to be described. Locking pin 9 is longer than bore 8 by approximately the length of the depth of notch 6, and is acted upon by a coil spring 12 surrounding locking pin 9, one end of which engages housing 1 of the steering lock while the other end engages a flange 11 of locking pin 9. The normal tendency of coil spring 12 is to release or unlock the steering lock. However, locking pin 9 is only able to move to release the steering lock if its end facing locking bolt 10 is able to slide into a transverse notch 13 on locking bolt 10 which has approximately the same depth as notch 6. Thus, unless bolt 10 is shifted so that its notch 13 registers with locking pin 9, key 7 cannot be operated to lock locking bar 5.

Immediately adjacent to the steering lock the invention provides a hot-bulb starter switch 14 which is combined with a start-and-stop control mechanism and the control handle 15 of which is connected with the hot-bulb starter switch 14 by means of a control shaft 16. Hot-bulb starter switch 14 is mounted on the dashboard of the vehicle which is not shown in the drawings by means of a bracket 17.

The start-and-stop control mechanism consists of a lever 18, as shown in Fig. 2, which is secured to control shaft 16, and to which a cable 20 of a Bowden wire 21 is connected by means of an eyelet 19. Lever 18 is combined with another lever 22, the free end of which carries a control pin 23 which extends from lever 22 in a direction parallel to control shaft 16.

One end of locking bolt 10 projects from housing 1 of the steering lock and carries a bifurcated control lever 24. In the positions illustrated in the drawings, control pin 23 enters into the opening between the two prongs of control lever 24 to engage therewith. Finally, an arresting device 25 which cooperates with shaft 16 for normally retaining control handle 15, for example, in its operative position, is provided underneath shaft 16.

The apparatus as above-described operates as follows:

If control handle 15 is in the horizontal operative position as shown in Fig. 1, lever 22 extends from control shaft 16 obliquely upward and assumes the position 22', as indicated in Fig. 2 in dot-and-dash lines. As a result of such position of levers 18 and 22, cable 20 which operates the start-and-stop mechanism permits the normal fuel control of the injection pump not shown in the drawing to operate in the usual manner when control pin 23 which is secured to lever 22 has moved the bifurcated lever 24 to its upper end position 24' in which it may be resiliently arrested by suitable spring means at the injection pump not shown. The starter switch 14 is not turned on in this operative position since the glow advance and starting operation is required only when the diesel engine is to be started, which is carried out in another position of control handle 15, as subsequently described.

When bifurcated lever 24 assumes the upper position 24', locking bolt 10 is shifted longitudinally so that locking pin 9 cannot engage into the transverse notch 13 of locking bolt 10. However, its other end engages notch 6 in locking bar 5 which is thus arrested in its retracted position within the housing 1 of the steering lock, in which in the respective operative position of control handle 15 key 7 cannot be turned either to the parking or stop position, thus also preventing the steering wheel from being locked.

If control handle 15 is turned counterclockwise to the stop position shown in Fig. 2, cable 20 is thereby tightened by lever 18 so that the injection pump will be moved to the stopping position, while, on the other hand, lever 22 and control pin 23 move bifurcated lever 24 to its lower end position, as shown in Fig. 2 in full lines. Lever 22 is resiliently retained in its lower end position by spring 31, as shown in Fig. 6. Such pivotal movement of bifurcated lever 24 shifts locking bolt 10 in a longitudinal direction relative to the operative position as previously described so that, immediately after the injection pump and thus the engine have been stopped, locking pin 9 can engage into transverse notch 13 of locking bolt 10 and be resiliently retained in such position by coil spring 12. Locking pin 9 thus no longer engages into notch 6 of locking bar 5 and the latter may, by an appropriate turn of key 7, be easily turned to the parking position or to the stop position, as shown in Fig. 2, in which bolt 5 locks the steering wheel shaft 4.

If the diesel engine is to be started, control handle 15 is turned in a clockwise direction from its horizontal operative position, whereby at first in an intermediate position of control handle 15 not shown in the drawings, the glow advance mechanism will be operated, whereupon, after control handle 15 has reached its end position, the operation of lever 18 and cable 20 adjusts the injection pump to supply the proper quantity of fuel needed for starting the engine, and also turns on the starter, not shown in the usual manner.

By turning control handle 15 to the starting position, lever 22 is moved still further toward the right as compared to position 22' shown in Fig. 2, so that control pin 23 will finally be outside of the opening between the prongs of bifurcated lever 24. Bifurcated lever 24, however, remains arrested in position 24', as shown in Fig. 2 in dot-and-dash lines, and cannot be moved downwardly from such position until control handle 15 is again moved to the stop position shown in Fig. 2 for stopping the diesel engine.

In the safety lock according to the modification of the invention shown in Figs. 3 and 4, housing 1 of the steering lock which is combined with a hot-bulb starter switch in a manner not particularly shown in the drawings is provided with a one-arm control lever 26 which is mounted on the locking bolt 10 of the steering lock in the manner similarly as described with respect to Figs. 1 and 2. This control lever 26 is acted upon by a torsion spring 27, the other end of which acts upon housing 1, and thus tends to assume a position corresponding to the driving position of the steering lock from which it is resiliently taken along by control pin 23 in the manner described with regard to Figs. 1 and 2 into a position 26' which corresponds to the stop position of the steering lock and which has been indicated in Fig. 4 in dot-and-dash lines.

Near its outer end, control lever 26 has a recessed portion 28 in which control pin 23 will be arrested in the stop position of control handle 15, and from which control pin 23 may be removed only by another operation of control handle 15 when control lever 26 is simultaneously released against the action of torsion spring 27. By such locking of control pin 23 and thus of control handle 15 in the stop position, the injection pump of the diesel engine also remains in its stopping position so that the engine cannot be started, for example, by rolling the vehicle down a hill, without first again moving control handle 15 to its operative position.

Although our invention has been illustrated and described with reference to the preferred embodiments thereof, we wish to have it understood that it is in no way limited to the details of such embodiments or to the specific examples described, but is capable of numerous modifications within the scope of the appended claims.

Having thus fully disclosed our invention, what we claim is:

1. In combination with a vehicle driven by a diesel engine having locking means for a steering wheel shaft, an injection pump, a hot-bulb starter switch having a lever, a handle connected to said shaft for operating said switch, mechanical means for connecting said switch with said pump so as to operate simultaneously, a steering lock comprising a locking bar, lockable means for sliding said locking bar into and out of locking engagement with said steering wheel shaft, said locking bar having a recess therein, and a locking mechanism adapted to engage in said recess of said locking bar to lock the same in its unlocked position, and means operated by said switch handle for unlocking said locking mechanism to free said locking bar only when said switch is turned to the off-position and said injection pump is operated to shut off the fuel supply.

2. In combination with a vehicle driven by a diesel engine having locking means for a steering wheel shaft, an injection pump, a hot-bulb starter switch having a lever, a handle connected to said lever for operating said switch, a safety lock for said engine comprising a housing, a locking bar slidable longitudinally within said housing, means operable by a removable key for moving said locking bar into and out of locking engagement with said steering wheel shaft, said locking bar having an aperture therein, a bolt mounted in said housing so as to be slidable in a longitudinal direction, a control lever mounted on said bolt, means for converting a rotary movement of said control lever into a sliding movement of said bolt, said bolt having an aperture therein, a locking pin interposed between said locking bar and said bolt and slidably mounted in said housing, said aperture in said locking bar being adapted to coincide with one end of said locking pin when said locking bar is withdrawn by said key to the unlocked position, a spring tending to move the other end of said locking pin into locking engagement with said aperture in said bolt when said bolt is shifted by the rotation of said control lever to the position in which said last mentioned aperture coincides with said other locking pin end, a cam lever on a shaft of said switch being adapted to engage said control lever to rotate the same, and means for connecting said switch lever with said pump for operating and stopping the same whereby when said switch handle is pivoted to the stopping position of said pump, said cam lever turns said control lever and thereby shifts said bolt so as to permit said locking pin to be pushed from its locking engagement with the aperture in said locking bar and to engage with the aperture in said bolt.

3. In a combination as defined in claim 2, wherein said control lever is of bifurcated shape having an opening between its prongs of a size sufficient to permit said cam lever to pivot from one end position to the other and to move said bolt into and out of the position whereat the aperture therein coincides with said locking pin, and spring means for resiliently arresting said control lever in at least one of its end positions as long as said control lever is not positively moved from said end position by an operation of said switch handle and a corresponding movement of said switch lever.

4. In a combination as defined in claim 2, wherein said control lever is a one-armed lever, further comprising a torsion spring tending to maintain said one-armed control lever in a position in which said locking pin engages into said aperture in said locking bar to hold said bar in the unlocked position, said switch lever being adapted to move said one-armed control lever and thus said locking pin into the locking position when said switch handle and said pump are moved in the stopping position.

5. In a combination as defined in claim 4, wherein said one-armed control lever has a recessed portion, said cam lever being adapted to engage in said recessed portion and to be maintained therein when said switch handle is in the stopping position until by operation of said switch handle said cam lever is moved against the action of said torsion spring to disengage from said recessed portion, thereby causing said one-armed control lever under the action of said spring to pivot and thereby to move said locking pin to its locking position.

6. In a combination as defined in claim 2, wherein said lever is a one-armed control lever, means for arresting said one-armed control lever and thus also said locking pin, said pump connecting means, and said switch handle in the stopping position until said switch handle is moved to its operative position.

References Cited in the file of this patent

UNITED STATES PATENTS

| | | |
|---|---|---|
| 1,691,774 | Matson | Nov. 13, 1928 |
| 2,203,949 | Edwards | June 11, 1940 |